United States Patent [19]
Werner et al.

[11] 3,863,747
[45] Feb. 4, 1975

[54] FRICTION DISC ASSEMBLY FOR A FRICTION COUPLING

[75] Inventors: Karl-Heinz Werner; Karl-Heinz Dotter, both of Schweinfurt am Main, Germany

[73] Assignee: Fichtel & Sachs AG, Schweinfurt am Main, Germany

[22] Filed: July 30, 1973

[21] Appl. No.: 383,614

[30] Foreign Application Priority Data
Aug. 3, 1972   Germany.............................. 287286

[52] U.S. Cl........... 192/106.2, 192/30 V, 192/70.17, 64/27 F
[51] Int. Cl. ....................... F16d 3/14, F16d 47/02
[58] Field of Search............ 192/30 V, 70.17, 70.18, 192/106.1, 106.2; 64/27 F, 27 C

[56]         References Cited
         UNITED STATES PATENTS
| | | | |
|---|---|---|---|
| 2,042,570 | 6/1936 | Wemp | 192/106.2 |
| 2,314,948 | 3/1943 | Nutt | 192/106.2 |
| 2,571,291 | 10/1951 | Reed | 192/106.2 X |
| 3,223,214 | 12/1965 | Kuivinen | 192/70.17 X |
| 3,375,911 | 4/1968 | Smirl | 64/27 F X |
| 3,534,841 | 10/1970 | Schneider et al. | 192/106.2 |
| 3,684,070 | 8/1972 | Maucher | 192/106.2 |

*Primary Examiner*—Samuel Scott
*Assistant Examiner*—Lance W. Chandler
*Attorney, Agent, or Firm*—Hans Berman; Kurt Kelman

[57]         ABSTRACT

A friction disc assembly in which a disc unit carrying the friction facings is mounted for limited angular displacement on a hub unit normally secured to the clutch shaft, and springs bias the disc unit toward an angular rest position relative to the hub unit, is provided with a first brake arrangement effective at low transmitted torque which impedes angular movement of a damper ring relative to the hub unit, and a second brake arrangement which impedes angular movement of the damper ring relative to the disc unit with much greater force. A helical compression spring axially biases the disc unit relative to the hub unit, and the axial motion of the disc unit under the biasing force of the spring is transmitted to the damper ring for engaging the first brake arrangement.

11 Claims, 4 Drawing Figures

FRICTION DISC ASSEMBLY FOR A FRICTION COUPLING

This invention relates to friction clutches suitable for use in automotive vehicles, and particularly to an improved friction disc assembly for a friction clutch.

The disc assembly with the improvement of which this invention is more specifically concerned has a hub unit and a disc unit connected for limited angular movement relative to each other about a common axis, springs which bias the disc unit toward an angular rest position on the hub unit, and a brake arrangement which frictionally impedes movement of the disc unit toward and away from the rest position and thereby damps oscillations which might otherwise be generated. To cause smooth response of the clutch to increasing transmitted torque, a damper element is provided and biased by a spring toward an angular rest position relative to the disc unit. Applied torque initially displaces the damper element against the restraint of its biasing spring and of another brake arrangement relative to the hub unit until cooperating abutments on the damper element and the hub unit engage, and the damper element thereafter moves jointly with the hub unit about the clutch axis.

It is an important object of the invention to improve the response of the known damper arrangement, and to provide a friction disc assembly whose damper arrangement has few movable parts capable of being assembled at low cost and rugged enough to ensure long, trouble-free operation.

According to the invention, a spring or its equivalent is axially interposed between a radial flange of the hub unit and one of the two fixedly connected radial discs of the disc unit which are offset from the hub flange in opposite axial directions. The spring biases the one disc axially away from the hub flange, thereby biasing the other disc toward the flange. The damper element is annular about the clutch axis, and motion is transmitted from the other disc to the annular damper element for joint axial movement of the disc and element under the biasing force of the spring when the other disc moves toward the hub flange. A friction device axially interposed between the damper element and the hub flange then is simultaneously engaged by the element and the flange to brake angular movement of the element relative to the hub unit.

Other features, additional objects, and many of the attendant advantages of this invention will readily be appreciated as the same becomes better understood by reference to the following detailed description of a preferred embodiment when considered in connection with the appended drawing in which.

Figure 4:
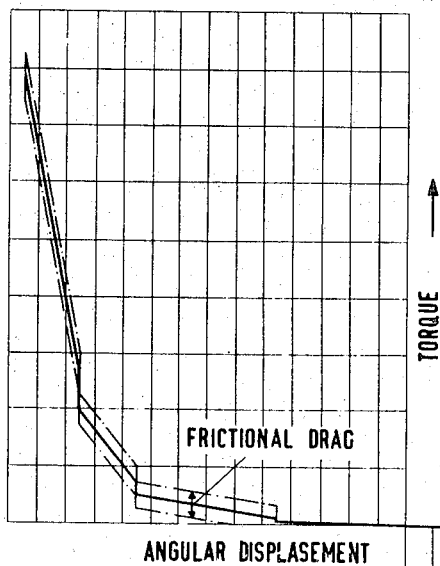
Figure 4:
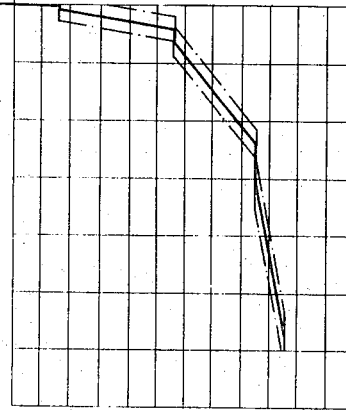

FIG. 4 diagrammatically illustrates the operating characteristics of the illustrated friction disc assembly.

Figure 1:
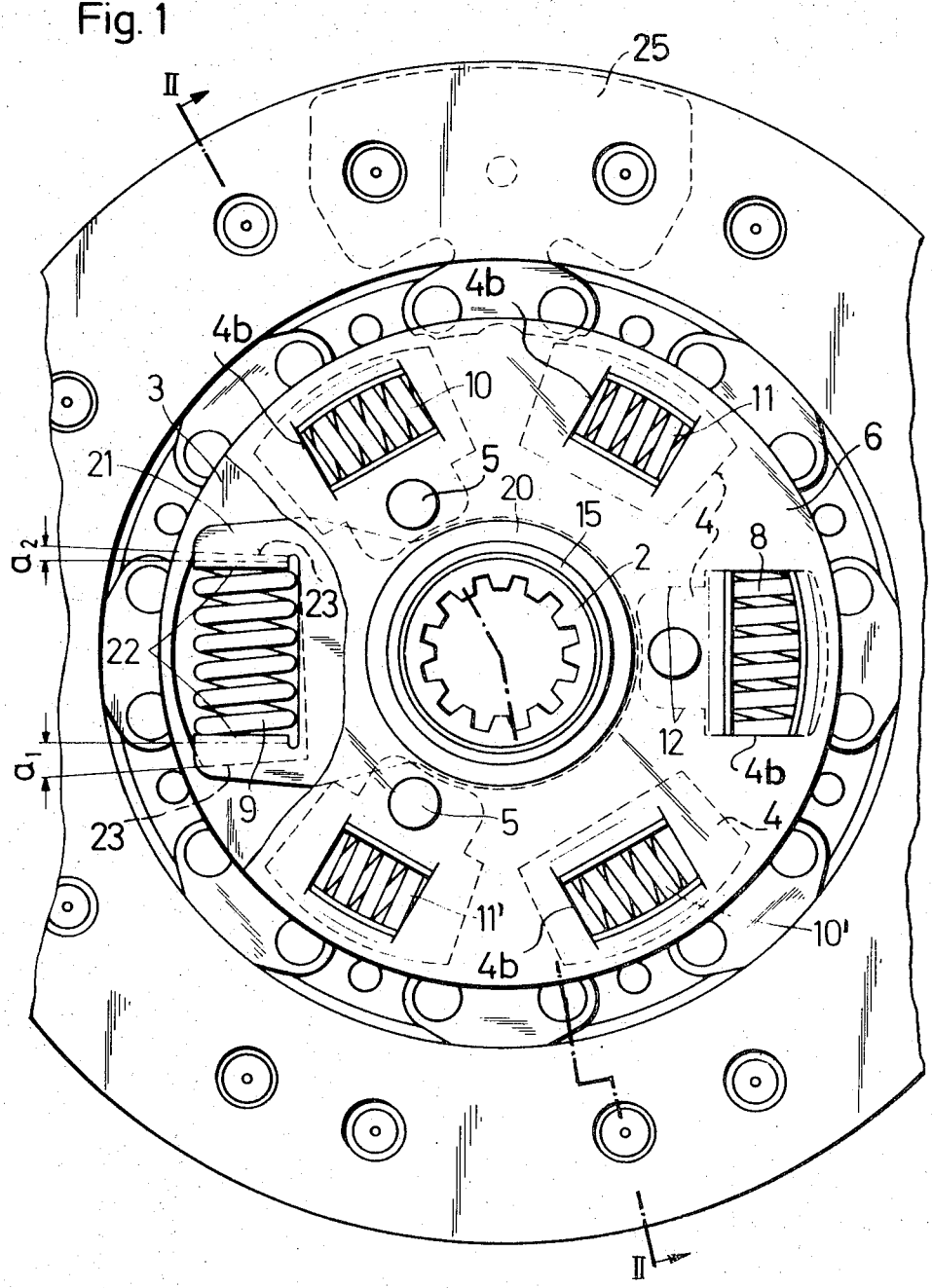
FIG. 1 is a fragmentary front elevational view of a friction disc assembly of the invention.
Figure 2:
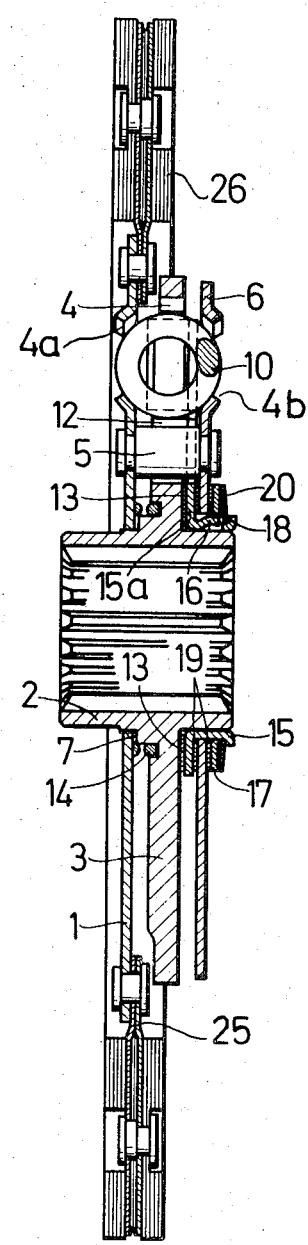
FIG. 2 shows the device of FIG. 1 in section on the line II — II.

Referring now to the drawing in detail, and initially to FIGS. 1 and 2, there is seen a friction disc assembly whose most conspicuous parts are a hub unit and a coaxial disc unit. The hub unit consists of an approximately cylindrical, tubular, internally splined member 2 and an integral flange 3 projecting from the member 2 in a radially outward direction. Six openings 4 differing in shape and size are provided in the flange 3 in approximately equiangularly spaced relationship.

The disc unit includes two discs 1, 6 of annular, circular shape movably enveloping respective axial portions of the hub member 2 on axially opposite sides of the flange 3. Three shoulder rivets 5 passing axially through respective openings 4 of the flange 3 fixedly fasten the two discs 1, 6 to each other in respective radial planes whose axial spacing is determined by the rivets 5. The outer circumferential portion of the disc 1 carries fixedly attached segments 25 on which the principal friction facings 26 of the disc assembly are fastened by rivets, as is conventional, so as radially to project beyond the flange 3 and the other disc 6.

Figure 3:
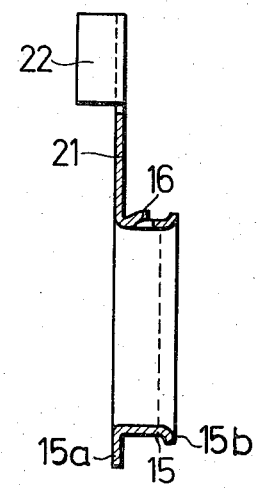
FIG. 3 shows an annular damper element of the assembly in radial section.

A damper ring having a cylindrical sleeve portion 15 and a radial flange portion 15a at one axial end of the sleeve portion 15 is freely movable on the axis portion of the hub member 2 remote from the disc 1. The sleeve portion 15 is received with radial clearance in a central axial opening of the disc 6, and the flange portion 15a is axially interposed between the disc 6 and the hub flange 3. As is best seen in FIG. 3, the circular edge 15b of the sleeve portion 15 is offset in a radially outward direction in the assembled damper ring to back and retain a coaxial, dished plate or cup spring 20 movably mounted on the sleeve portion 15 and axially engaging a flat pressure ring 17. Three radial notches 18 in the inner circumference of the ring 17 are engaged by respective, integral, radial projections 16 on the sleeve portion 15 with little or no circumferential clearance so that angular movement of the ring 17 on the sleeve portion 15 is limited to much less than 30°. Flat friction rings 19 of the same material as the facings 26 are arranged on the sleeve portion 15 on opposite sides of the disc 6 for axial engagement with the flange portion 15a and the pressure ring 17 respectively.

A flat annular disc 13 of polytetrafluoroethylene (Teflon) between the flange portion 15a and the hub flange 6 impedes relative angular movement of the damper ring 15, 15a and the hub flange 3 when the damper ring is moved toward the flange 3 by the spring 14.

The friction ring 19 axially interposed between the disc 6 and the flange portion 15a also transmits axial motion from the disc unit to the damper ring when the disc 6 is moved by the spacer rivets 5 toward the hub flange 3. The disc 6 is biased toward the flange 3 by a helical compression spring 14 coiled about the common axis of the hub and disc units and axially interposed between the disc 1 and the flange 3 near the axially enlarged, radially innermost portion of the hub flange. The ends of the spring 14 respectively abut against the flange 3 in an annular retaining groove of the latter and against a portion of the disc 1 axially aligned with the groove. Circumferentially distributed, narrow projections 7 on the disc 1 keep the disc 1 spaced from the hub flange 3 and hold friction between the flange and the disc to a minimum.

Six openings 4a, 4b in each of the discs 1, 6 are at least partly coextensive with the openings 4 of the flange 3, and springs 8, 9, 10, 10', 11, and 11' are received in respective sets of axially aligned openings 4, 4a, 4b in a manner best seen in FIG. 2 with reference to the spring 10. The openings 4, 4a, 4b, which receive the spring 8 are of equal circumferential length so that spring 8 abuttingly engages two circumferentially opposite edge portions of each of the discs 1, 6 and of the hub flange 3. The spring 8 opposes all relative angular motion of the hub unit and of the disc unit, and biases the latter toward an angular rest position relative to the hub portion, or vice versa.

The openings 4 receiving the springs 10, 10', 11, 11' are circumferentially longer than the associated openings 4a, 4b so that the springs 10, 10', 11, 11' oppose relative angular movement of the disc and hub units only after some relative rotation has taken place. The openings 4 associated with the springs 8, 10, 11' are radially enlarged so as to receive the spacer rivets 5, and approximately radial edges 12 of the openings 4 abuttingly cooperate with the rivets 5 to limit relative angular motion of the disc and hub assemblies.

The spring 9 normally fits the associated openings 4a, 4b in a manner not specifically illustrated, but equal to the corresponding showing for the spring 8, and it is also received circumferentially between two abutments 22 facing each other in a circumferential direction and integrally fastened to an arm 21 radially projecting from the damper ring 15, 15a, as is best understood by joint consideration of FIGS. 2 and 3. The spring 9 thus biases the ring 15, 15a relative to the disc unit toward the rest position shown in the drawing. The opening 4 in the hub flange 3 which receives the spring 9 is circumferentially longer than the spring 9, the associated openings 4a 4b, and the spacing of the abutment faces on the arm 21. Angular clearances $a_1$, $a_2$ are left between the abutments 22 and cooperating abutment edges 23 of the flange hub 3 in the corresponding opening 4 when the ring 15, 15a is in the rest position shown in FIG. 2.

When torque transmitted by the partly illustrated clutch initiates relative angular displacement of the hub and disc units, the movement of the disc assembly is transmitted to the damper ring 15, 15a by the spring 9 and the arm 21. Such movement is opposed by the weak braking torque exerted by the plastic ring 13 under the contact pressure of the spring 14. When the disc and hub units have turned relative to each other in one direction through the angle $a_1$ or in the opposite direction through the angle $a_2$, an abutment 22 on the damper ring 15, 15a engages the associated abutment edge 23, whereby relative angular movement of the damper ring and of the disc unit is limited. The spring 9 thereafter assists the spring 8, and further angular displacement of the two units is impeded by the brake constituted by the friction rings 19 and associated elements 17, 20.

FIG. 4 is a graph in Cartesian coordinates illustrating the operating characteristics of the clutch disc assembly. The frictional drag or torque caused by the brake arrangement including the ring 13 during idling of the associated engine or other minimal transmitted torque being too small to permit pictorial representation on the scale of FIG. 4. During the three stages of torque transmission in which the brake arrangement including the friction rings 19 becomes effective, the frictional drag or torque is identical as indicated by chain-dotted lines and their spacing in the direction of the ordinate.

During idling, or when the torque to be transmitted from the hub member 2 to the friction facings 25 is minimal, there is no relative angular displacement between the damper ring 15, 15a and the disc unit. The range of angular movement affected by the idling brake arrangement including the plastic ring 13 is defined by the angles $a_1$ and $a_2$, and only the spring 8 is operative.

The hub unit is free to turn relative to the damper ring or element 15, 15a within this range. Drag is exerted by the low friction between the friction ring 13 and cooperating faces of the flange portion 15a and the hub flange 3 under the contact pressure of the spring 14. Polytetrafluoroethylene has a very low coefficient of friction in contact with the metal surfaces of the flange 3 and the flange portion 15a to provide the low braking effect sought at this stage. Uncontrolled frictional engagement between the flange 3 and the disc 1 is prevented by the projections 7.

As torque increases beyond the idling stage, the spring 9 comes to the assistance of the spring 8, as described above, and the characteristic line deviates visibly from the abscissa of the graph. The springs 10, 10' become operative in the next stage, and ultimately the springs 11, 11', because the openings 4 receiving the last-mentioned springs provide more circumferential clearance than those receiving the springs 10, 10' as is seen in FIG. 2. The damper ring 15, 15a is coupled for joint movement with the flange hub 3 by the cooperating abutments 22, 23 at a torque higher than idling torque so that the damper ring turns relative to the disc unit, and the brake arrangement including the spring unit, the pressure ring 17, and the friction rings 19 of relatively high coefficient of friction becomes effective.

The illustrated preferred embodiment of the invention may be modified in many ways that will be obvious to those skilled in the art on the basis of the above teachings.

Thus the circumferential dimensions of the notches 18 and the associated projections 16 may be increased within the limits indicated above to provide two stages of frictional braking during operation outside the idling range. The braking effect may also be increased by axially juxtaposing a plurality of friction rings where only one ring 19 has been illustrated.

The cooperating abutments connecting the damper ring 15, 15a to the hub flange 3 may be made different from what is explicitly shown in the drawing and has been described above. The arm 21 may thus be provided with an axially directed pin received in a suitably dimensioned recess of the hub flange 3, or a transversely offset, integral lug of the arm 21, not engaged by a helical spring, may engage a recess of the hub flange 3.

If it is desired to provide different braking effects for the two directions of relative angular movement of the hub and disc units, the arm 21 may be provided with only one abutment 22 for the spring 9 so that frictional damping of relative angular displacement of the ring and the hub flange is obtained only during torque transmission in one direction.

Other changes and modifications of the structure illustrated and specifically described will readily suggest themselves, and it should be understood that the foregoing disclosure relates only to a preferred embodiment of the invention, and that it is intended to cover all changes and modifications of the example of the invention herein chosen for the purpose of the disclosure which do not constitute departures from the spirit and scope of the appended claims.

What is claimed is:

1. A coupling disc assembly for a friction coupling comprising:

a. a hub unit including a tubular hub member having an axis, and a flange member projecting from said hub member in a radially outward direction;

b. a disc unit including a first radial disc member and a second radial disc member coaxially movable relative to said hub unit and offset from said flange member in opposite axial directions, and a plurality of spacer members fixedly connecting said disc members for joint movement;

c. first yieldably resilient means operatively interposed between said units for angularly biasing said disc unit toward an angular rest position relative to said hub unit;

d. an annular damper element coaxially movable relative to said units;

e. second yieldably resilient means operatively interposed between said disc unit and said element for angularly biasing said element toward an angular rest position relative to said disc unit;

f. cooperating abutment means on said element and on said hub unit engageable for limiting angular displacement of said element relative to said hub unit;

g. first brake means for impeding angular movement of said element relative to said hub unit between said rest position of the element and a position of abutting engagement of said abutment means, said first brake means including
  1. spring means operatively interposed between said flange member and one of said disc members for biasing said one disc member axially away from said flange member and for thereby biasing the other disc member toward said flange member,
  2. motion transmitting means operatively connecting said element to said other disc member for joint axial movement when said other disc member moves toward said flange member under the biasing force of said spring means, and
  3. friction means axially interposed between said element and said flange member for simultaneous engagement with said element and said flange member;

h. second brake means interposed between said disc unit and said element for frictionally impeding angular movement of said element relative to said disc unit; and i. friction facing on a radially outer circumferential portion of said first disc member.

2. An assembly as set forth in claim 1, wherein said element has a sleeve portion coaxially enveloping said hub member and a flange portion radially projecting from said sleeve portion, said friction means being axially interposed between said flange portion and said flange member, said other disc member being formed with an axial opening therethrough receiving said sleeve portion, and said second brake means including additional friction means operatively interposed between said other disc member and said sleeve portion.

3. An assembly as set forth in claim 2, wherein said additional friction means include two friction elements axially offset from said other disc member in opposite axial directions, one of said friction elements being interposed axially between said other disc member and said flange portion for simultaneous engagement, an annular pressure member, and a spring member axially secured on said sleeve member, said pressure member being axially interposed between said spring member and the other friction element for simultaneous axial engagement of said other friction element with said pressure member and said other disc member.

4. An assembly as set forth in claim 3, further comprising securing means limiting angular displacement of said pressure member relative to said sleeve portion.

5. An assembly as set forth in claim 3, wherein said spring member is a cup spring.

6. An assembly as set forth in claim 1, wherein said spring means include a helical compression spring coiled about said axis and axially interposed between said flange member and said one disc member.

7. An assembly as set forth in claim 1, wherein said abutment means on said damper element includes an abutment member radially spaced from said axis and facing in a circumferential direction, said disc members being formed with respective, axially aligned apertures spaced from said axis, and said second resilient means including a helical compression spring received in said apertures, said spring having two circumferentially spaced terminal portions abuttingly engaging said abutment member and at least one of said disc members respectively.

8. An assembly as set forth in claim 7, wherein said abutment means on said damper element include an arm radially projecting from said damper element and carrying said abutment member.

9. An assembly as set forth in claim 8, wherein said flange member is formed with an aperture axially interposed between the apertures of said disc members and receiving said compression spring, said flange member having an edge portion bounding the aperture thereof in a circumferential direction, said abutment member being movably received in said aperture of the flange member, and said edge portion constituting an element of said abutment means on said hub unit.

10. An assembly as set forth in claim 1, further comprising spacer means interposed between said one disc member and said flange member for limiting frictional contact therebetween.

11. An assembly as set forth in claim 1, wherein said friction means include a friction member of synthetic resin composition, the coefficient of friction between said composition and the materials of said element and of said flange member being low enough to reduce the braking force of said first brake means less than the braking force of said second brake means.

* * * * *

UNITED STATES PATENT OFFICE
CERTIFICATE OF CORRECTION

Patent No. 3,863,747          Dated February 4, 1975

Inventor(s) KARL-HEINZ WERNER ET AL

It is certified that error appears in the above-identified patent and that said Letters Patent are hereby corrected as shown below:

In the heading, line /30/, change "287286" to

-- G 72 28 728.6 --.

Signed and sealed this 1st day of April 1975.

(SEAL)
Attest:

RUTH C. MASON
Attesting Officer

C. MARSHALL DANN
Commissioner of Patents
and Trademarks